United States Patent [19]  [11] 4,430,249
Gate  [45] Feb. 7, 1984

[54] PREPARATION OF AQUEOUS SUSPENSIONS OF TALC

[75] Inventor: Leonard F. Gate, St. Austell, England

[73] Assignee: English Clays Lovering Pochin & Co., Ltd., St. Austell, England

[21] Appl. No.: 313,816

[22] Filed: Oct. 22, 1981

[30] Foreign Application Priority Data

Oct. 23, 1980 [GB] United Kingdom ............... 8034180

[51] Int. Cl.$^3$ ...................... B01J 13/00; C04B 31/40; C08K 7/00; C09C 3/06
[52] U.S. Cl. ............................... 252/313 R; 106/291; 106/308 Q; 162/181.6; 252/314
[58] Field of Search ........................ 252/313 R, 314; 162/181.6; 106/291, 308 Q

[56] References Cited

U.S. PATENT DOCUMENTS

| 2,259,457 | 10/1941 | Croll | 252/313 R X |
|---|---|---|---|
| 2,844,486 | 7/1958 | Lamar | 106/308 Q |
| 3,227,607 | 1/1966 | Mays et al. | 162/181.6 |
| 3,798,174 | 3/1974 | Acker et al. | 252/313 S X |
| 4,187,192 | 2/1980 | Sheridan | 252/313 R |

FOREIGN PATENT DOCUMENTS 2019822 11/1979 United Kingdom ............ 252/313 R

OTHER PUBLICATIONS

Tappi Monograph No. 38 on "Paper Coating Pigments" (Tappi, 1976), Chap. 9, Talcs, pp. 178–190.

Primary Examiner—Richard D. Lovering
Attorney, Agent, or Firm—Weingram & Klauber

[57] ABSTRACT

In order to make talc more readily dispersible in an aqueous medium, it is contacted, in a finely divided form, with an aqueous solution of an alkali metal hydroxide or ammonium hydroxide, it is then washed with clean water, whereafter it is thermally dried to remove at least a substantial proportion of the water associated therewith. The talc thus treated can be suspended in water containing a dispersing agent.

10 Claims, 1 Drawing Figure

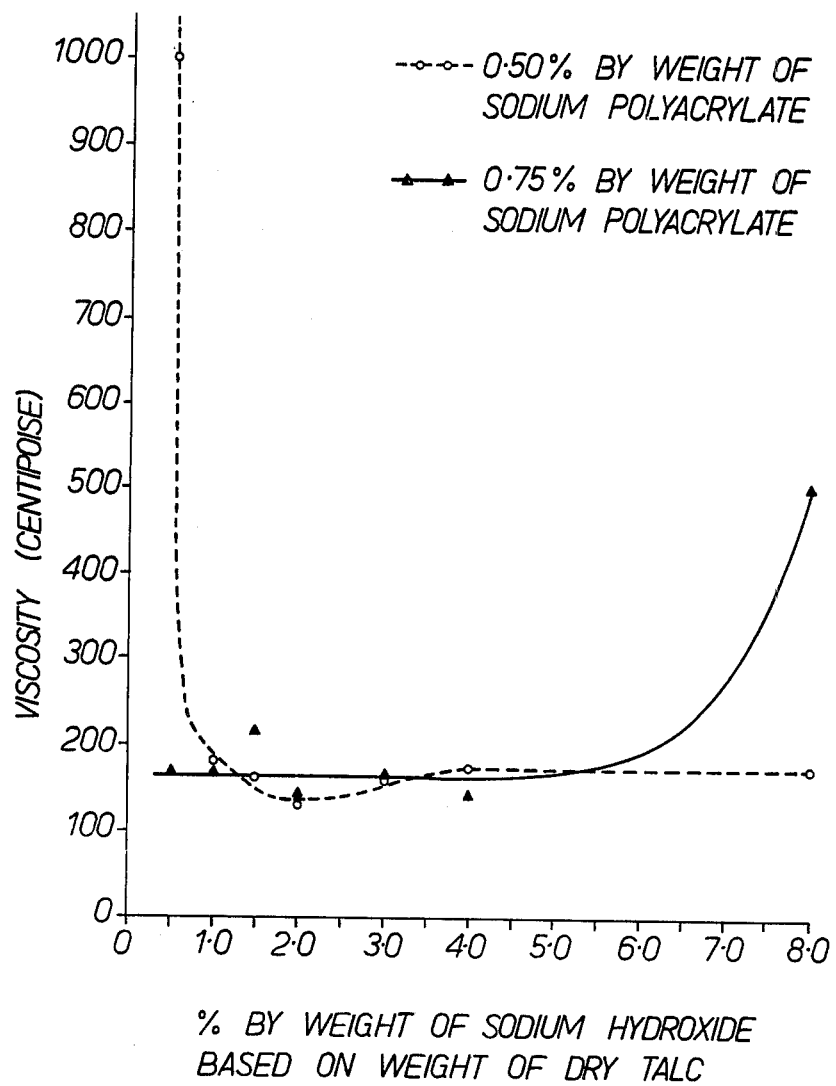

PREPARATION OF AQUEOUS SUSPENSIONS OF TALC

BACKGROUND OF THE INVENTION

This invention relates to the preparation of aqueous suspensions of talc and, more particularly, is concerned with a method of treating talc in order to make it more readily dispersible in aqueous media.

By the term "talc" there is meant herein a mineral comprising at least 60% by weight and preferably at least 80% by weight of true mineralogical talc, i.e. hydrous magnesium silicate having the theoretical molecular composition $3MgO. 4SiO_2.H_2O$. (see also "Industrial Minerals and Rocks" published by The American Institute of Mining Metallurgy and Petroleum Engineers, New York 1960, pages 835-836).

Talc has a water-repellent, or hydrophobic, crystal surface. This property makes it very difficult to wet talc with water and as a result the preparation of an aqueous suspension containing a high proportion by weight of talc is expensive in terms of time and energy. The use of talc as a paper coating pigment has hitherto been severely limited because paper coating compositions are conventionally in the form of aqueous suspensions of one or more pigments and one or more adhesives. The solids concentration of such a composition is governed by the need for the composition to be sufficiently fluid to enable it to be spread evenly over the surface of a paper web by coating machinery and yet to contain the minimum amount of water since the latter must subsequently be removed from the coated paper by thermal evaporation.

The problems caused by the hydrophobic nature of the surface of talc have been overcome hitherto by introducing a wetting agent into the water used for suspending the talc. However, the wetting agents or surfactants known at present are expensive and increase substantially the cost of using talc as a paper coating pigment. They also have a tendency to produce foam and an antifoaming agent must often be used in conjunction with them.

SUMMARY OF THE INVENTION

According to the present invention there is provided a method of treating talc in order to make it more readily dispersible in an aqueous medium which method comprises contacting the talc, in a finely divided form, with an aqueous solution of an alkali metal hydroxide or ammonium hydroxide, washing the talc after contact with said aqueous solution, and thermally drying the washed talc to remove at least a substantial proportion of the water associated therewith.

The dry or substantially dry talc prepared by the method of the invention can be suspended in the required quantity of water to obtain an aqueous suspension of talc of a desired solids concentration.

The alkali metal hydroxide or ammonium hydroxide solution preferably contains from 0.2 to 10.0% by weight, most preferably from 1 to 6% by weight, of alkali metal hydroxide or ammonium hydroxide based on the weight of dry talc. The concentration of the alkali metal hydroxide or ammonium hydroxide solution does not appear to be critical, but it has been found to be convenient to use a solution containing from 5 to 20 g. of alkali metal hydroxide or ammonium hydroxide per 100 ml of solution.

The finely divided talc may be treated with the alkali metal hydroxide or ammonium hydroxide solution at room temperature or at a higher temperature up to the boiling point of the alkali metal hydroxide or ammonium hydroxide solution. The talc should be held in contact with the alkali metal hydroxide or ammonium hydroxide solution for a time, dependent on the temperature of the alkali metal hydroxide or ammonium hydroxide solution, which is in the range of from 1 minute to about 20 hours. It has been found, for example, that at room temperature the talc should be left in contact with the alkali metal hydroxide or ammonium hydroxide solution for at least 15 minutes.

Contact between the talc and the alkali metal hydroxide or ammonium hydroxide solution can be facilitated by subjecting a mixture thereof to agitation by means of, for example, a mechanical stirrer or a centrifugal pump. Alternatively, the talc may be subjected to a wet grinding process in the presence of the alkali metal hydroxide or ammonium hydroxide solution, using as the grinding medium balls of a metallic, stone or ceramic material or a granular grinding material such as sand, glass beads or granules of a ceramic material or of a hard calcined kaolin. This method has the advantage of ensuring that the talc is in a finely divided form, i.e. that substantially all of the talc is smaller than 53 microns, and of facilitating contact between the surface of the talc and the alkali metal hydroxide or ammonium hydroxide solution.

After the talc has been contacted with the alkali metal hydroxide or ammonium hydroxide solution, it is washed with clean water, preferably by dewatering the mixture of the alkali metal hydroxide or ammonium hydroxide solution and talc, and passing through the dewatered solid thus obtained clean water. e.g. tap water, distilled water or deionised water. This operation may be repeated one or more times, as required, to remove substantially all of the alkali metal or ammonium salts from the talc i.e. until not more than 20 parts by weight of alkali metal or ammonium ions per $10^6$ parts by weight of talc remain adsorbed on the talc.

The washed talc is then subjected to a thermal drying process, preferably at a temperature exceeding 60° C., by heating it in an oven, for example.

When it is desired to prepare an aqueous suspension of a talc treated in accordance with the method of the invention, it is preferable to dissolve in the water in which the dry, or substantially dry, treated talc is to be suspended a dispersing agent. Advantageously, there is dissolved in the water from about 0.3 to about 1.0% by weight, based on the weight of the talc, of a dispersing agent selected from the grooup comprising water-soluble condensed phosphates, water-soluble salts of a polysilicic acid and water-soluble salts of a polycarboxylic acid, such as a polyacrylic acid, a polymethacrylic acid or a copolymeric acid of the type disclosed in British Patent Specification No. 1,414,964. In addition, it is also advantageous to subject the dry or substantially dry, treated talc to high energy grinding, in the dry state, before suspending it in water.

A talc treated in accordance with the method of the invention can be suspended in water with the expenditure of much less time and stirring energy than is the case with a talc prepared by conventional methods.

The invention is further illustrated by the following Examples.

EXAMPLE 1

A beneficiated and comminuted natural talc from Finland had a particle size distribution such that 0.05% by weight thereof consisted of particles larger than 53 microns, 1% by weight thereof consisted of particles having an equivalent spherical diameter larger than 10 microns and 45% by weight thereof consisted of particles having an equivalent spherical diameter smaller than 2 microns.

160 g portions of this talc were added to varying quantities of a sodium hydroxide solution containing 10 g of sodium hydroxide per 100 ml of solution (10% w/v solution), and in each case the mixture obtained was mechanically stirred at a temperature of 65° C. for 1½ hours. At the end of this time the treated talc was separated by filtration and washed by performing three times the operation of passing 800 ml of deionised water through the filter cake. Fianlly the filter cake was dried in an oven at 80° C.

The portions of dried talc were then crushed by pestle and mortar and suspended in water containing 0.25% by weight, 0.50% by weight or 0.75% by weight, based on the weight of dry talc, of a sodium polyacrylate dispersing agent having a number average molecular weight of 1650, to form a suspension containing 55% by weight of dry talc. The viscosity of the resulting suspension was then measured at 22° C. using a Brookfield Viscometer with Spindle No. 3 at 100 rpm. The results obtained are set forth in Table 1 below and are also shown graphically in the accompanying FIG. 1.

TABLE 1

| % by weight of sodium hydroxide, based on weight of dry talc | % by weight of sodium polyacrylate, based on weight of dry talc | Viscosity of suspension (centipoise) |
|---|---|---|
| 0.5 | 0.50 | 1000 |
| 1.0 | " | 180 |
| 1.5 | " | 165 |
| 2.0 | " | 130 |
| 3.0 | " | 160 |
| 4.0 | " | 175 |
| 8.0 | " | 175 |
| 0.5 | 0.75 | 170 |
| 1.0 | " | 170 |
| 1.5 | " | 215 |
| 2.0 | " | 145 |
| 3.0 | " | 170 |
| 4.0 | " | 145 |
| 8.0 | " | 500 |

All the portions of the treated talc which were suspended in water containing only 0.25% by weight of the sodium polyacrylate dispersing agent formed suspensions which, at a solids content of 55% by weight, had a viscosity at 22° C. in excess of 1000 centipoise.

EXAMPLE 2

Further 160 g portions of the same talc as was used in Example 1 were added to 64 ml of a 10% w/v sodium hydroxide solution (equivalent to 4% by weight of sodium hydroxide based on the weight of dry talc) and the mixtures thus obtained were left standing for varying times at a temperature of 20° C. The treated talc was then separated by filtration and washed by performing three times the operation of passing 800 ml of deionised water through the filter cake. Finally the filter cake was dried in an oven at 80° C.

The dried talc was then crushed by pestle and mortar and suspended in water containing 0.5% by weight, based on the weight of dry talc, of the same sodium polyacrylate dispersing agent as was used in Example 1 to form a suspension containing 55% by weight of the dried, treated talc. The viscosity of the suspension was measured at 22° C. using a Brookfield Viscometer with Spindle No. 3 at 100 rpm. The results obtained are set forth in Table II below.

TABLE II

| Time of contact of talc with sodium hydroxide solution hours | Viscosity of suspension (centipoise) |
|---|---|
| ½ | 229 |
| 1 | 170 |
| 2 | 182 |
| 4 | 192 |
| 18 | 163 |

EXAMPLE 3

Two further 160 g portions of the same talc as was used in Examples 1 and 2 were added to 64 ml of a 10% w/v sodium hydroxide solution and the mixtures thus obtained were left standing for 18 hours at a temperature of 20° C. The treated talc was then separated by filtration and washed by performing three times the operation of passing 800 ml of deionised water through the filter cake. Finally the filter cake was dried in an oven at 80° C.

Both portions of the dried talc were suspended in water containing 0.5% by weight, based on the weight of dry talc, of the sodium polyacrylate dispersing agent previously used to form a suspension containing 55% by weight of the treated talc. However, one portion of the dried talc was subjected to high energy dry milling in a laboratory analytical mill before being suspended in mortar. In both cases the viscosity of the suspension was measured at 22° C. using a Brookfield Viscometer with Spindle No. 3 at 100 rpm. The results obtained are set forth in Table III below.

TABLE III

| Treatment of dry talc before resuspension | Viscosity of suspension (centipoise) |
|---|---|
| Pestle and mortar | 163 |
| High energy milling | 71 |

EXAMPLE 4

Further 160 g portions of the same talc as was used in the preceding Examples were added to 64 ml of a 10% w/v sodium hydroxide solution and the mixtures obtained were left standing for 18 hours at a temperature of 20° C.

The portions of treated talc were then separated by filtration and washed by performing three times the operation of passing 800 ml of deionised water through the filter cake. Each portion was then suspended in water containing 0.5% by weight, based on the weight of dry talc, of the same sodium polyacrylate dispersing agent to form a suspension containing 55% by weight of dry talc. One portion was mixed with water while still in the form of a filter cake, i.e. without drying, whereas, the other portions of filter cake were dried at different temperatures and crushed by pestle and mortar before being suspended in water. In each case the viscosity of the suspension formed was measured at 22° C. using Brookfield Viscometer with Spindle No. 3 at 100 rpm and the results obtained are set forth in Table IV below

TABLE IV

| drying temperature (°C.) | viscosity of suspension (centipoise) |
|---|---|
| undried | >1000 |
| 60 | 1000 |
| 80 | 163 |
| 150 | 160 |
| 300 | 90 |

EXAMPLE 5

Three further 160 g portions of the same talc as was used in the preceding Examples were added to 64 ml. of a 10% w/v solution of sodium hydroxide and the mixture mechanically stirred for 18 hours at a temperature of 20° C.

The portions of treated talc were in each case separated from the suspension by filtration. One portion of filter cake was dried immediately without any washing. A second portion was washed twice, and a third portion was washed three times, each washing being performed by passing 800 ml of deionised water through the filter cake. Each portion was then dried in an oven at 80° C.

In each case the dried, treated talc was crushed by pestle and mortar and suspended in water containing 0.5% by weight, based on the weight of dry talc, of the same sodium dispersing agent as was used in the preceding Examples to form a suspension containing approximately 55% by weight of dry talc. The viscosity of each suspension was then measured at 22° C. using a Brookfield Viscometer with Spindle No. 3 at 100 rpm and the weight of sodium salts remaining on the talc was determined by atomic absorption analysis. The results obtained are set forth in Table V below.

TABLE V

| Treatment of portion | % by weight of dry talc in suspension | viscosity of suspension (centipoise) | amount of adsorbed sodium salts (ppm)* |
|---|---|---|---|
| Unwashed | 55.3 | 820 | 493 |
| Washed twice | 55.8 | 175 | 12 |
| Washed three times | 55.7 | 164 | 8 |

*"ppm" means parts by weight of sodium ion per $10^6$ parts by weight of dry talc.

These results show that it is necessary to wash the filter cake in order to remove substantially all of the sodium salts from the talc if the greatest possible reduction in viscosity of the aqueous suspension is to be obtained.

What is claimed is:

1. A method of treating talc in order to make it more readily dispersible in an aqueous medium which method comprises contacting the talc, in a finely divided form, with an aqueous solution of an alkali metal hydroxide or ammonium hydroxide, washing the talc after contact with said aqueous solution, and thermally drying the washed talc to remove at least a substantial proportion of the water associated therewith.

2. A method according to claim 1, wherein the alkali metal hydroxide or ammonium hydroxide solution contains from 0.2 to 10.0% by weight of alkali metal hydroxide or ammonium hydroxide based on the weight of dry talc.

3. A method according to claim 1, wherein the talc is held in contact with the alkali metal hydroxide or ammonium hydroxide solution for a time ranging from 1 minute to about 20 hours.

4. A method according to claim 1, wherein the talc is contacted with said aqueous solution by subjecting the talc to a wet grinding process in the presence of the alkali metal hydroxide or ammonium hydroxide solution.

5. A method according to claim 1 wherein the talc is washed by dewatering the mixture of the aqueous alkali metal hydroxide or ammonium hydroxide solution and talc, and passing through the dewatered solid thus obtained clean water.

6. A method according to claim 1, wherein the talc is washed until not more than 20 parts by weight of alkali metal or ammonium ions per $10^6$ parts by weight of talc remains adsorbed on the talc.

7. A method according to claim 1, wherein the washed talc is thermally dried at a temperature exceeding 60° C.

8. A method according to claim 1, wherein the thermally dried talc is subjected to high energy grinding in the dry state.

9. A process for preparing an aqueous suspension of talc which process comprises contacting the talc, in a finely divided form, with an aqueous solution of an alkali metal hydroxide or ammonium hydroxide, washing the talc after contact with said aqueous solution, thermally drying the washed talc to remove at least a substantial proportion of the water associated therewith, and then suspending the thermally dried talc in water which contains a dispersing agent.

10. A process according to claim 9, wherein the water in which the thermally dried talc is suspended contains from 0.3 to 1.0% by weight, based on the weight of talc, of a dispersing agent selected from the group consisting of water-soluble condensed phosphates, water-soluble salts of a polysilicic acid and water-soluble salts of a polycarboxylic acid.

* * * * *